(12) United States Patent
Wong et al.

(10) Patent No.: US 7,676,497 B2
(45) Date of Patent: Mar. 9, 2010

(54) APPARATUS AND METHOD FOR REPORT PUBLICATION IN A FEDERATED CLUSTER

(75) Inventors: Ryan Hong Yeh Wong, Vancouver (CA); Mark Allerton, Vancouver (CA); Carlos Mejia, Vancouver (CA)

(73) Assignee: Business Objects Software Ltd., Dublin (IE)

( * ) Notice: Subject to any disclaimer, the term of this patent is extended or adjusted under 35 U.S.C. 154(b) by 390 days.

(21) Appl. No.: 11/241,773

(22) Filed: Sep. 29, 2005

(65) Prior Publication Data

US 2006/0080323 A1    Apr. 13, 2006

Related U.S. Application Data

(60) Provisional application No. 60/615,061, filed on Sep. 30, 2004.

(51) Int. Cl.
*G06F 7/00* (2006.01)
*G06F 17/00* (2006.01)

(52) U.S. Cl. .................................... 707/104.1
(58) Field of Classification Search ........................ None
See application file for complete search history.

(56) References Cited

U.S. PATENT DOCUMENTS

| | | | |
|---|---|---|---|
| 6,070,191 A * | 5/2000 | Narendran et al. | 709/226 |
| 2003/0229618 A1 | 12/2003 | Judy | |
| 2004/0015908 A1 | 1/2004 | Giel et al. | |
| 2004/0047354 A1 | 3/2004 | Slater et al. | |
| 2005/0027712 A1 | 2/2005 | Gargi et al. | |

FOREIGN PATENT DOCUMENTS

WO    WO 2005/089217    9/2005

OTHER PUBLICATIONS

Oracle1, "Oracle9i Application Server: Oracle Reports" (full version: http://www.oracle.com/technology/products/reports/pdf/iasreports.pdf), Feb. 1, 2002, 1-21.*

(Continued)

*Primary Examiner*—Jean B. Fleurantin
*Assistant Examiner*—Aleksandr Kerzhner
(74) *Attorney, Agent, or Firm*—Cooley Godward Kronish LLP

(57) ABSTRACT

A report publication system includes a first set of report management servers defining a first cluster supporting a common report management architecture. A first set of client machines operate in accordance with the common report management architecture. The first client machines are configured to access the first cluster. A second set of report management servers defines a second cluster supporting the common report management architecture. A second set of client machines operate in accordance with the common report management architecture. The second client machines are configured to access the second cluster. A first client machine of the first set of client machines invokes a report on the first cluster to form a published report with a designated destination address. The published report is exchanged between the first cluster and the second cluster via the Internet in accordance with the destination address. A second client machine of the second set of client machines accesses the published report through the second cluster.

14 Claims, 4 Drawing Sheets

OTHER PUBLICATIONS

Blanton, "Microsoft Computer Dictionary," Jan. 22, 2002, Microsoft Press, Fifth Edition, 182 and 409.*

Oracle2, "Oracle9 iAS Reports Services: Publishing Reports to the Web" (full version: http://download.oracle.com/docs/pdf/A92102_01.pdf), Feb. 1, 2002, "1-11" and "6-1"-"6-6".*

Oracle3, "Oracle9i Reports: Building Reports" (full version: http://download.oracle.com/docs/pdf/B10310_01.pdf), Oct. 1, 2002, "1-1"-"1-49" and "8-1" -"8-18".*

Elmasri et al., "Fundamentals of Database Systems," Dec. 28, 1993, Addison-Wesley, Second Edition, 715-716.*

Lucas et al., "Special Edition Using Crystal Enterprise 8.5," May 31, 2002, Que, 1-27.*

Bouguettaya, et al., "Supporting Dynamic Interactions Among Web-Based Information Sources," *IEEE Transaction on Knowledge and Data Engineering*, vol. 12, Issue 5, Sep.-Oct. 2000, pp. 779-801.

* cited by examiner

APPARATUS AND METHOD FOR REPORT PUBLICATION IN A FEDERATED CLUSTER

CROSS REFERENCE TO RELATED APPLICATIONS

This application claims the benefit of U.S. Provisional Application Ser. No. 60/615,061, entitled "Apparatus and Method for Report Publication in a Federated Cluster," filed Sep. 30, 2004, the contents of which are hereby incorporated by reference in their entirety.

BRIEF DESCRIPTION OF THE INVENTION

This invention relates generally to the generation of reports in computer networks. More particularly, this invention relates to a technique for publishing reports in a computer network supporting federated clusters of computers.

BACKGROUND OF THE INVENTION

The term report refers to structured information generated from a data source, such as a database. Reporting is a process of accessing, formatting, and delivering data as information inside and outside an organization. Report accessing and formatting techniques are well developed. The current invention is directed toward resolving some of the shortcomings associated with existing report delivery techniques.

Before the advent of the corporate intranet, the principal challenge for enterprise reporting systems was to create useful reports and distribute them effectively. At the time, client based departmental solutions worked acceptably with standard databases in a local area network, but information administrators would encounter problems when legacy systems, distributed networks, different machine types, manual installation, and related issues emerged. The corporate intranet offered the promise of a solution to these complexities, introducing technologies that would make it possible to disseminate reporting information throughout an organization—even to disparate platforms—without the burdensome manual overhead that client-based packages involved.

Early releases of web-based reporting solutions, such as Crystal Enterprise®, sold by Business Objects Americas, Inc., San Jose, Calif., provided functionality to facilitate some forms of enterprise reporting. The corporate intranet provided a vehicle to facilitate the transport of information, but the reporting systems themselves were reliant on back-end servers to orchestrate the presentation and delivery of reports. In the absence of server hardware that could match the exponential growth of client requests in a corporate enterprise, the new challenge became not so much "distributing reports," but distributing thousands upon thousands of reports to thousands of users. That is, the current challenge is distributing information in a highly scalable environment.

To address the challenge of scalability, Crystal Enterprise was implemented using server cluster technology. The clustering paradigm is simple: a cluster consists of a collection of interconnected servers deployed as a single, unified computing resource. Users of Crystal Enterprise access, for example, a server cluster, rather than a single management server machine within the cluster framework.

Because each member of a server cluster remains, effectively, anonymous and interchangeable from a client's perspective, the methodology creates the illusion of a singular system—presented to the desktop user—while servicing the client needs with the power of distributed processing.

This cluster technology made it possible for Crystal Enterprise to attain very high availability using what is generally termed failover. Failover refers to an architecture in which server machines are coupled together to listen for a "heartbeat" signal, which is broadcast from each machine in the cluster to the others. When a heartbeat 'stops', the workload of the failed server is automatically transferred to an operative server.

Advantageously, cluster technology allows for additional machines to be added to a cluster while it continues to perform its operations. This dynamic scaling equips information technology departments with the means to scale to significant levels without disrupting client service. However, existing solutions have limitations. In particular, existing solutions are designed only to satisfy the typical linear scaling model. In addition, the technology is not able to effectively meet the needs of growing enterprises that include geographically dispersed data systems.

In view of the foregoing, it would be highly advantageous to provide improved cluster technology. In particular, it would be highly advantageous to provide an improved cluster technology for the efficient publication of reports.

SUMMARY OF THE INVENTION

The invention includes a report publication system. The report publication system has a first set of report management servers defining a first cluster supporting a common report management architecture. A first set of client machines operate in accordance with the common report management architecture. The first client machines are configured to access the first cluster. A second set of report management servers defines a second cluster supporting the common report management architecture. A second set of client machines operate in accordance with the common report management architecture. The second client machines are configured to access the second cluster. A first client machine of the first set of client machines invokes a report on the first cluster to form a published report with a designated destination address. The published report is exchanged between the first cluster and the second cluster via the Internet in accordance with the destination address. A second client machine of the second set of client machines accesses the published report through the second cluster.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
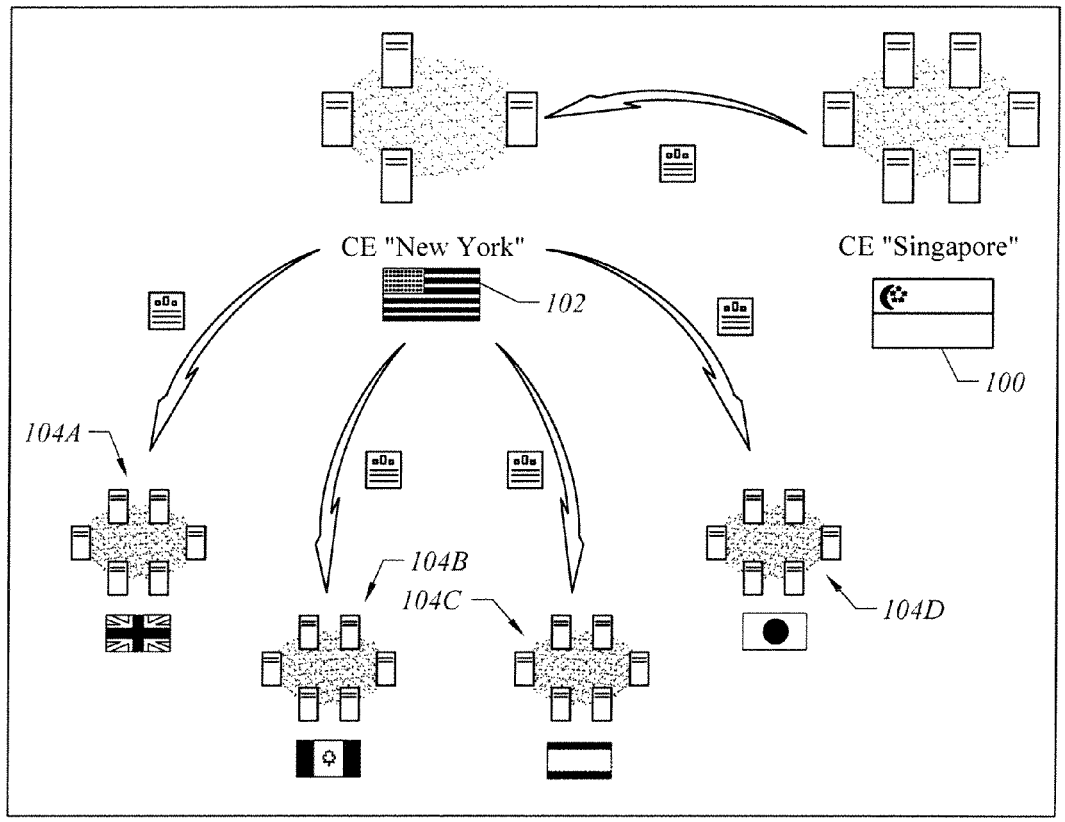
FIG. 1 illustrates report distribution across a federated cluster in accordance with an embodiment of the invention.

The invention utilizes a federated cluster architecture. A federated cluster architecture includes groups of server computers. Each group of server computers utilizes a common report management architecture to respond to requests from client computers assigned to a group. The individual groups observe a common protocol to form an association governed by the common report management architecture.

In accordance with an embodiment of the invention, user requests are distributed across a federation of clusters. For example, if a single cluster supports 100,000 objects, then 10 of these clusters federated together sustain a system with 1,000,000 objects. That is, the user requests are divided into each cluster with users 1-100,000 in the first cluster, users 100,000-200,000 in the second cluster, and so on.

This model satisfies the geographic constraints associated with prior art architectures. In addition, this model makes a reporting system inherently scalable (rather than a function of careful applications development). By implementing this model in a report distribution framework, the invention replicates report data between clusters.

The advantage of the invention is illustrated with the following example. Consider a bank with hundreds of customer branch offices located throughout Europe, Asia, and North America. Each of these offices maintains a log of all customer trading activities, and information contained in these logs (e.g., size of trade, time of trade, etc.) are used by corporate headquarters in each region (e.g., continent) for research pertaining to the setting of commission rates, relocation of broker personnel, and the like.

In such an environment, it is possible to deploy a single reporting system located in, say, New York, which is capable of harvesting the trading information, and then disseminating it throughout the various global regions. For example, trading data from Hong Kong is piped to the databases in New York, where a report is run to display data characteristics, and this report is then requested by London headquarters for review (assuming that individuals in London knew of its existence).

The obvious drawback in this scenario is that the computing resource overhead to accomplish the required data transfers is overwhelming and the complexities involved with setting up such a global reporting system significantly tax the resources available to corporate information technology personnel. It is also important to note that users in different locations experience marked differences in performance when attempting to view reports.

With the cluster federation architecture of the invention, each of the regions deploys a separate, standalone reporting system that is clustered to provide the required scalability to match separate needs. Each customer office submits the required data to its local reporting system. From there, reports are generated and are published to any other cluster in another country. For example, a manager in Hong Kong can simply publish a "Sum of Days Trading" report from his office to New York. From there, US based managers can access the report from their own reporting system—with the same performance as those residing in Hong Kong.

Observe that information technology departments do not require a complex system setup for data delivery. Instead, as discussed below, the plug-in model utilized in accordance with the invention makes the publication of reports to another clustered system as simple as if a report were simply scheduled to a local printer.

The invention may be implemented using an enterprise reporting tool, such as Crystal Enterprise. Crystal Enterprise is a web-based, report management and distribution system. Built on an open-infrastructure model, the modular architecture's framework makes it possible for components to not only interact with each other, but with other standard technologies as well. This modularity allows system administrators to cluster key server components with load balancing, failover, caching, and the like. However, there exists a definite threshold limiting the scalability of a single Crystal Enterprise deployment. The performance of a Crystal Enterprise system is (for the most part) directly proportional to the size of the deployment, and as such, the system is inherently constrained by footprint limitations and corresponding increases in management complexity. Thus, a single Crystal Enterprise deployment does not scale sufficiently to address the data visualization and exploration requirements dictated by extremely large-scale systems.

The invention's use of cluster federation addresses these problems. Cluster federation makes it possible to couple multiple Crystal Enterprise deployments using the Internet infrastructure as the system's communication media. This infrastructure—forming federated clusters of Crystal Enterprise systems—provides scaling capacity and performance characteristics similar to that available from current Internet E-Mail systems and World Wide Web hyperlinks.

At the conceptual level, a cluster federation is simply the coupling of multiple servers supporting a common report management architecture. For example, a cluster federation may be implemented to support a common report management architecture in the form of a Crystal Enterprise deployment. The cluster federation deployments can be either located within one organization or situated across multiple sites.

Using cluster federation, it is possible to not only resolve user and data scalability issues, but of equal importance, it is possible to address framework distribution and reliability limitations that simply cannot be realized with a single deployment. In particular, because communications are conducted using the Internet infrastructure, the cluster federation paradigm inherently facilitates effective data and information transfers between geographically dispersed systems.

FIG. 1 illustrates operations of the invention. In particular, the figure illustrates a manufacturing production site forming a cluster 100 in Singapore. Another cluster 102 is located in New York. In the cluster federation model, the Singapore cluster 100 shares its production data by "publishing" reports to the New York cluster 102, rather than rely on a complex system setup from the New York deployment to retrieve reports. Likewise, the New York cluster 102 is configured to "push" reports to various clusters 104A-104D in different geographical regions. Alternately, clusters 104A-104D can be configured by local administrator to discover and "pull" published reports from New York into their local system. These operations are facilitated by a plug-in architecture, which is discussed below.

Figure 2:
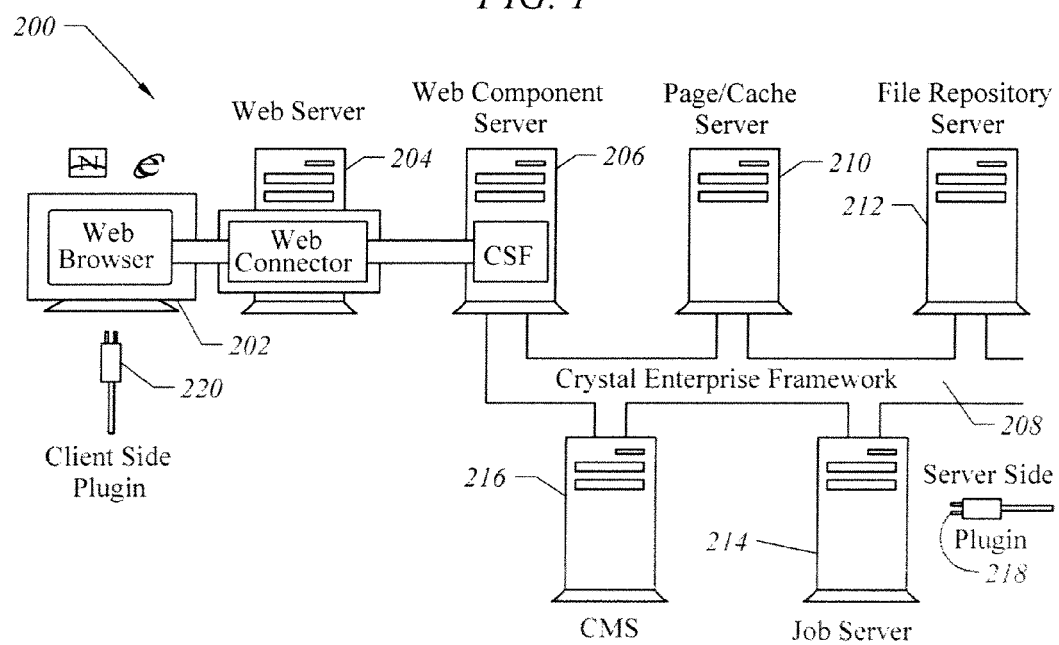
FIG. 2 illustrates a client-server architecture deployed in a federated cluster in accordance with an embodiment of the invention.

FIG. 2 illustrates a server configuration that may be utilized in a cluster in accordance with an embodiment of the invention. By way of example, the figure illustrates a Crystal Enterprise system 200 with a client machine 202, which interfaces with a web server 204. The web server 204 is connected to a web component server 206. The web component server 206 utilizes an enterprise framework 208 to communicate with a page/cache server 210, a file repository server 212, a job server 214, and a central management server 216. The enterprise framework 208 constitutes a common report management architecture. FIG. 2 also illustrates a server side plug-in 218 and a client side plug-in 220, which are discussed below.

The architecture 200 implements report construction and viewing services. The enterprise network framework of FIG. 2 serves as the transport layer between client and server components, providing access to system services. The client 202 utilizes these services.

The enterprise framework 208 manages communication and data exchange between all client and server components installed in a Crystal Enterprise deployment. As shown in FIG. 2, components within the system 200 access the framework 208 before interacting with other components. Effectively, the framework 208 acts as a kind of telephone exchange, providing a directory of available services in the system, and helping to establish connections between clients needing a service and the servers providing the required service.

Each of the Crystal Enterprise server components is implemented using a number of well-defined interfaces that collectively define the server's function. This design makes possible a significant level of openness, as Crystal Enterprise client components do not need to concern themselves with any server side object implementation details. To the clients 202, the server side objects are simply intelligence that can reside anywhere on a network. They are packaged as components that can be accessed via method invocations, and the only element of concern is the interface a server object publishes.

The central management server 216 comprises the core of the Crystal Enterprise system. Tasks implemented by the central management server 216 may include: manage users and user groups, manage object security, manage machines, central system configuration, manage scheduled tasks, database management, name service, cluster management, and scheduling.

The central management server 216 includes an information store. The information store contains information objects. In accordance with the invention, information-containing objects are treated as generic entities, referred to as information objects. The central management server information store is used to store each information object. The information store can use a variety of different native databases for persistent storage. A standard query language, such as SQL, is used to make a query for the retrieval of information objects (Info Objects). For example, to retrieve all Info Objects that are owned by the user "JohnDoe", the following query can be used:

InfoStore->Query("select * from SI_INFOOBJECTS where SI_OWNER='JohnDoe'");

Once an information object has been retrieved, its behavior may be defined with a plug-in. These plug-ins are Dynamic Link Libraries (DLLs) that define the specific behavior of objects—such as reports, folders, users, and servers. Both the plug-ins and the objects that are instantiated by the plug-ins are info objects that can be stored in, and retrieved from, the central management server information store.

For customized client objects, developers specify the info object, processing, scheduling, and any action details. An info object interface is implemented for any object that resides in an enterprise client component. The interface specifies the identity and the properties that define the object.

A processing info interface is implemented if the custom object is processed in the enterprise back-end. This interface provides information to the processing job server to process the job. For example, a report plug-in implements processing information to store information such as selection formula, prompts, input/output directory, and the like.

A schedule information interface is implemented if the object is to be schedulable. For example, information such as schedule start time, schedule based on calendar, schedule dependency information, and the like are defined.

An action interface, a generic term used here to identify optional interfaces, specifies other specific actions requiring support by the custom client object (e.g., viewable, designable, searchable, etc.). This interface is implemented to disclose actions supported by an info object. The user can choose to hide the supported actions by not publishing the information to this interface.

In addition to various interfaces, the invention may also use various DLLs. A driver plug-in is a DLL that exposes a number of standard calls available to developers. Support for third-party plug-ins encompasses plug-in defined desktop objects, object processing, and security authentication. Thus, the invention is fully customizable and can be adapted to suit any customer's specific business solution needs.

Various plug-ins may be used in accordance with embodiments of the invention. For example, a front-end information object plug-in may be used on the client side. A middle tier plug-in may be used on the central management server to operate as a security driver. A backend plug-in may reside on the job server 214 and operate as job processing DLLs.

In accordance with the invention, users can schedule a report instance to be sent to a specific destination—this can be on a computer or network, a file location, email, FTP, or to a printer. Each destination object has a corresponding plug-in that can be used to specify print options.

Figure 3:
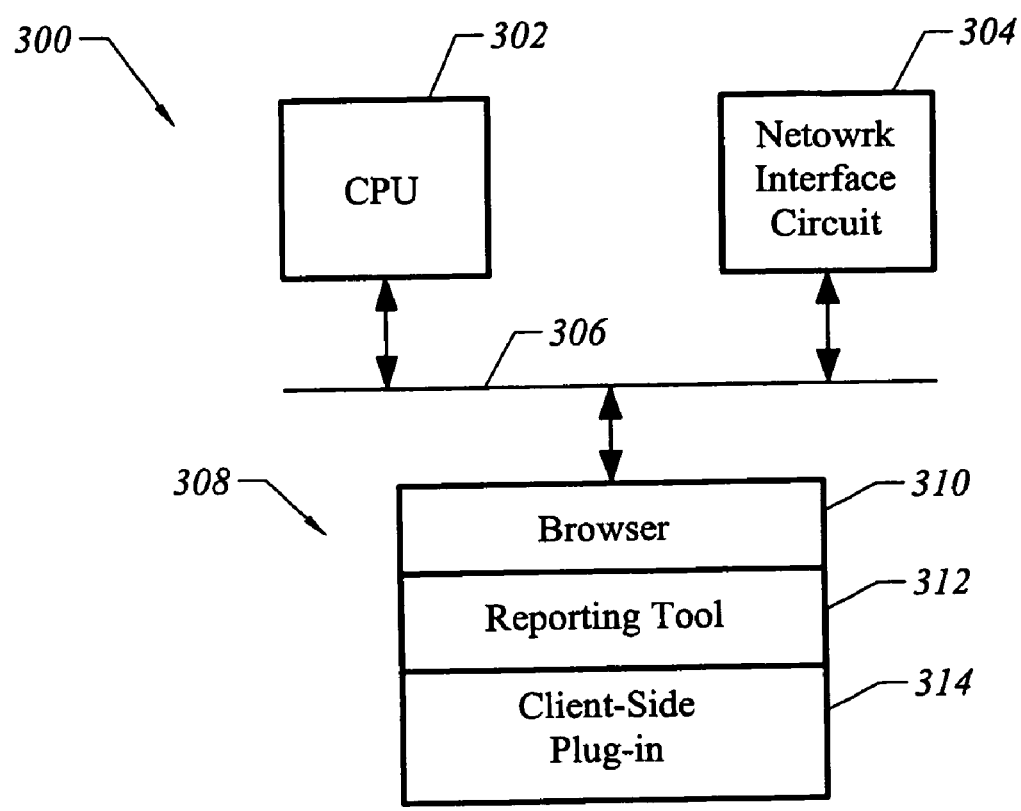
FIG. 3 illustrates a client computer configured in accordance with an embodiment of the invention.

FIG. 3 illustrates a client computer 300 configured in accordance with an embodiment of the invention. The computer 300 includes standard components including a CPU 302, which communicates with a network interface circuit 304 via a bus 306. A memory 308 is also connected to the bus 306. The memory 308 stores a set of executable programs including a browser 310, a reporting tool 312, and a client-side plug-in 314 of the type previously described. The reporting tool 312 may be any reporting tool that is operative with a server side common report management architecture.

Figure 4:
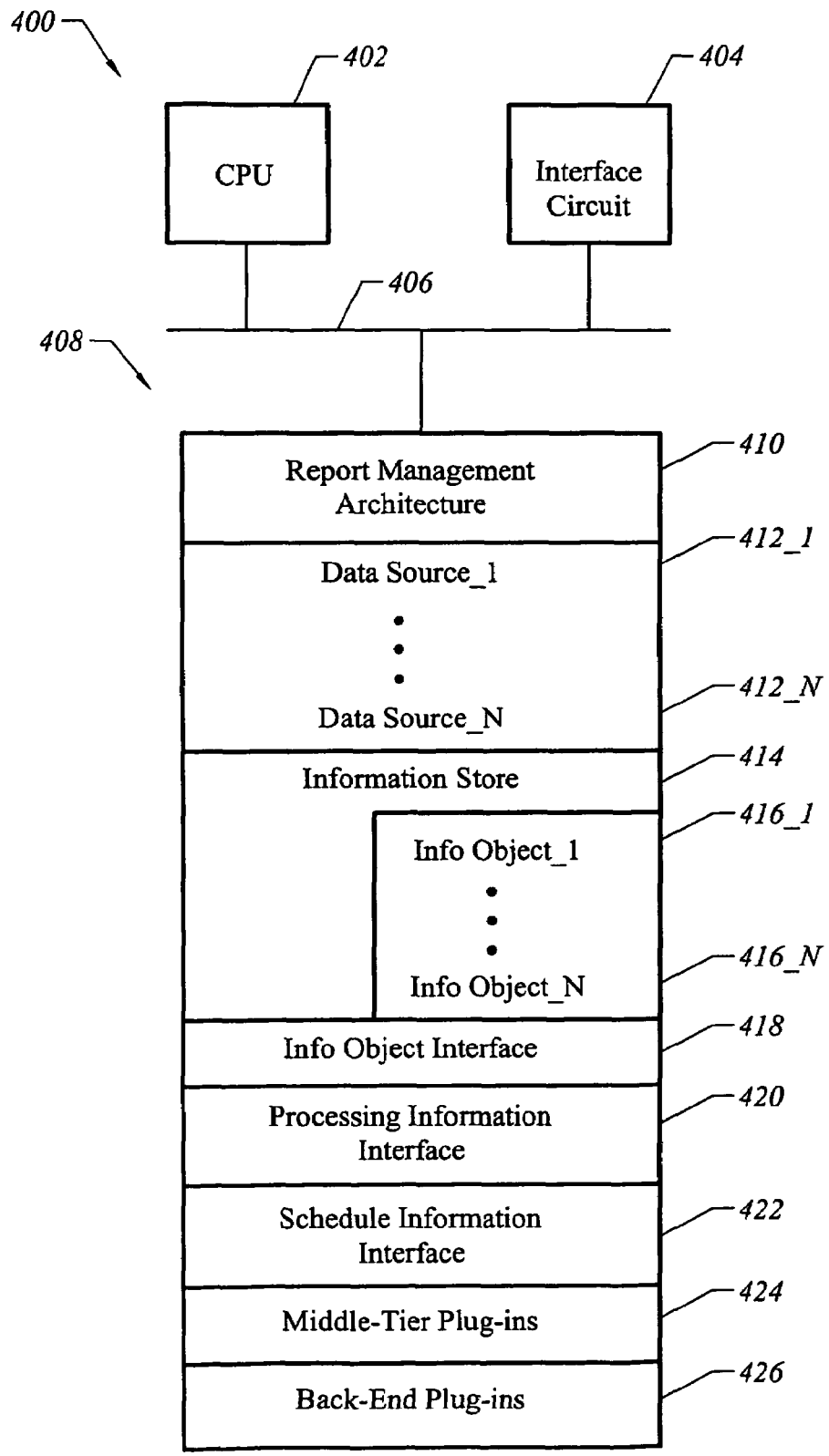
FIG. 4 illustrates a server computer configured in accordance with an embodiment of the invention.

FIG. 4 illustrates a server computer 400 configured in accordance with an embodiment of the invention. The server 400 includes standard components including a CPU 402, which communicates with a network interface circuit 404 via a bus 406. A memory 408 is also connected to the bus 406. The bus 406 stores a set of executable programs including a report management architecture module 410. By way of example, the report management architecture module 410 may be Crystal Enterprise, sold by Business Objects Americas, Inc., San Jose, Calif. The report management architecture 410 produces reports based upon underlying data sources 412_1 through 412_N.

The memory 408 includes an information store 414, which store information objects 416_1 through 416_N. As previously indicated, each information object is a generic data source. The information store 414 may be combined with the data sources 412.

The memory 408 also stores an information object interface 418, a processing information interface 420, and a schedule information interface 422 of the types previously described. Middle-tier plug-ins 424 and back-end plug-ins 426 of the type previously described may also be stored in memory 408.

The executable modules stored in memory 408 may be distributed across a variety of servers. For example, these modules may be distributed across the file repository server 212, job server 214, and central management server 216 of FIG. 2. The locations at which the functions of the invention are performed are insignificant. FIG. 4 merely serves to illustrate the types of executable modules that may be used to implement the operations of the invention, regardless of where or how those functions are implemented.

Figure 5:
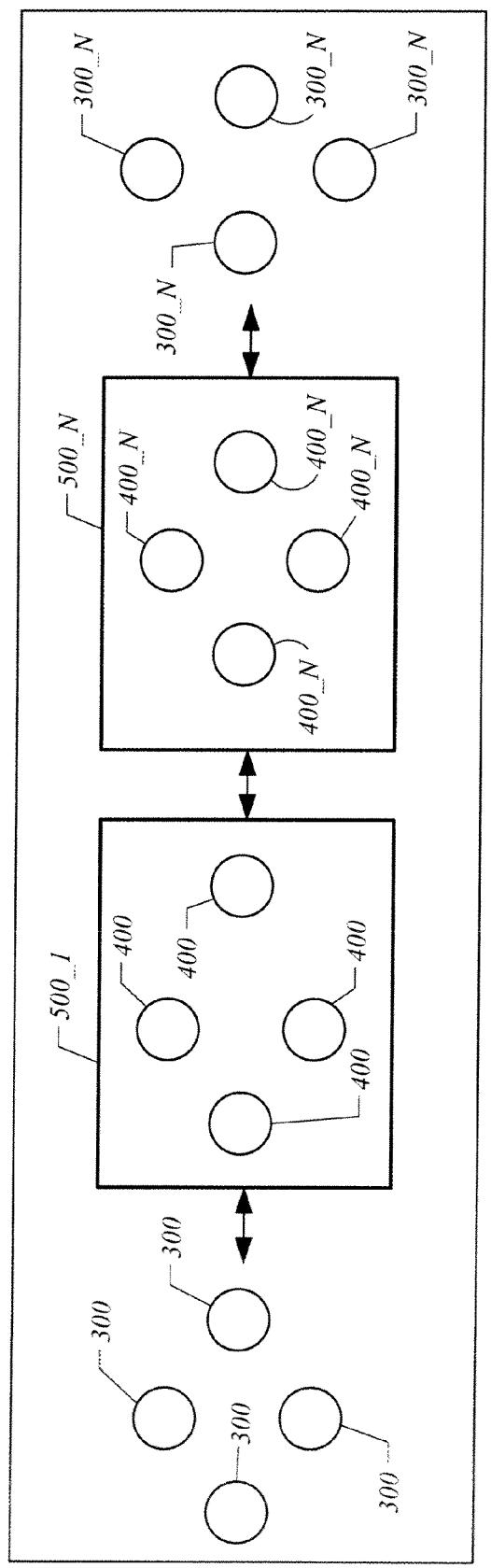
FIG. 5 illustrates a federated cluster configuration configured in accordance with an embodiment of the invention.

FIG. 5 illustrates that a set of client computers 300 are grouped together to access a set of server computers 400. The set of server computers 400 form an enterprise framework or cluster 500_1. Similarly, client computers 300_N communicate with server computers 400_N. Server computers 400_N form a second cluster 500_N. Cluster 500_1 communicates with cluster 500_N. This architecture may be repeated to form largely scaled clusters.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A report publication system, comprising:
 a first plurality of report management servers defining a first cluster supporting a common report management architecture;
 a first plurality of client machines operating in accordance with said common report management architecture, said first plurality of client machines being configured to access said first cluster;
 a second plurality of report management servers defining a second cluster supporting said common report management architecture;
 a second plurality of client machines operating in accordance with said common report management architecture, said second plurality of client machines being configured to access said second cluster;
 wherein said first plurality of report management servers and said second plurality of report management servers are interconnected through the Internet to form a federated cluster;
 wherein a first client machine of said first plurality of client machines invokes a report on said first cluster to form a published report with a designated destination address;
 wherein said published report is exchanged between said first cluster and said second cluster via the Internet in accordance with said destination address; and
 wherein a second client machine of said second plurality of client machines locally accesses said published report through said second cluster as a generic information object accessed via a method invocation that passes parameters to an object interface that specifies the identity and the properties that define the generic information object.

2. The report publication system of claim 1 wherein said first plurality of client machines access said first cluster as a common object.

3. The report publication system of claim 1 wherein said first plurality of report management servers is configured to support a processing information interface specifying server job processing instructions.

4. The report publication system of claim 1 wherein said first plurality of report management servers is configured to support a schedule information interface to specify object scheduling parameters including schedule start time and schedule dependency information.

5. The report publication system of claim 1 wherein said first plurality of client machines include front-end plug-ins implemented as dynamic linked libraries to define object processing and security authentication for said generic information object.

6. The report publication system of claim 1 wherein said first plurality of report management servers include middle-tier plug-ins implemented as dynamic linked libraries to support security operations.

7. The report publication system of claim 1 wherein said first plurality of report management servers include back-end plug-ins implemented as dynamic linked libraries to support job processing.

8. The report publication system of claim 1 further comprising a central management server.

9. The report publication system of claim 8 wherein said central management server manages users and user groups.

10. The report publication system of claim 8 wherein said central management server manages object security and scheduled tasks.

11. The report publication system of claim 8 wherein said central management server provides database management, name service and cluster management.

12. The report publication system of claim 8 further comprising executable instructions to process a standard query language query that retrieves information objects.

13. The report publication system of claim 8 further comprising executable instructions to process plug-ins implemented as dynamic linked libraries to support customized customer processing.

14. The report publication system of claim 13 wherein the customized customer processing includes defined desktop objects, object processing and security authentication.

* * * * *